Figure 1:
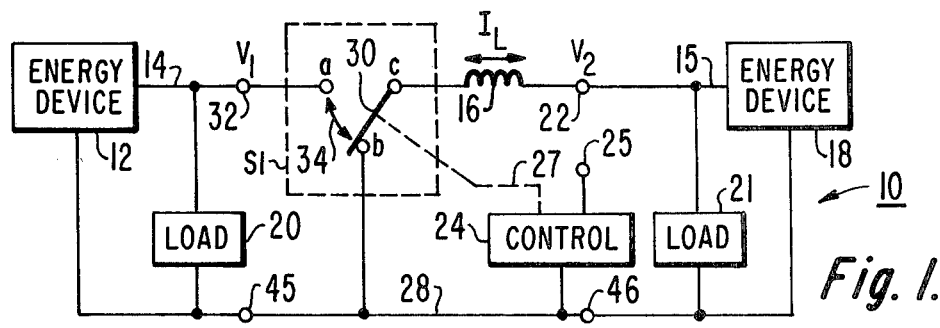

United States Patent [19]

Berard, Jr. et al.

[11] 4,143,282

[45] Mar. 6, 1979

[54] BILATERAL ENERGY TRANSFER APPARATUS

[75] Inventors: Clement A. Berard, Jr., Trenton; Jonathan S. Kinsley, Freehold, both of N.J.

[73] Assignee: RCA Corporation, New York, N.Y.

[21] Appl. No.: 747,084

[22] Filed: Dec. 3, 1976

[51] Int. Cl.² ............................................. H02J 1/00
[52] U.S. Cl. .................................... 307/43; 307/149; 323/15
[58] Field of Search ................. 307/112, 151, 149, 11, 307/43, 38, 39, 66, 23; 320/21; 323/15

[56] References Cited

U.S. PATENT DOCUMENTS

| 3,317,809 | 5/1967 | Bowers et al. | 307/66 |
| 3,696,286 | 10/1972 | Ule | 307/66 |
| 3,790,816 | 2/1974 | Berman | 307/149 |
| 3,816,804 | 6/1974 | Cardwell, Jr. | 320/9 |

Primary Examiner—James R. Scott
Assistant Examiner—Morris Ginsburg
Attorney, Agent, or Firm—H. Christoffersen; Samuel Cohen; William Squire

[57] ABSTRACT

Energy is transferred between first and second terminals by opening and closing a first current path between the first terminal and ground while concurrently operating a second current path in complementary fashion. The second current path connects in one embodiment between the two terminals and in another embodiment between the second terminal and ground. In both embodiments an inductor is common to the two paths and the duty cycle (time a path is closed per period) is controllable, for example, as a function of the voltage at at least one of the terminals.

14 Claims, 6 Drawing Figures

BILATERAL ENERGY TRANSFER APPARATUS

The present invention relates to bilateral energy transfer apparatus.

Spacecraft such as earth orbiting satellites include a self-contained source of electrical energy for supplying power to their various loads (such as transmitters, sensors and other electrical power consuming systems). This source may include both a solar energy panel (an array of solar cells) and a battery system, the latter for supplying power when the solar panel is receiving insufficient light. Energy transfer devices are usually provided for transferring power from the solar panel to the battery system and the loads and, when needed, for transferring power from the battery system to the loads.

An energy transfer device usually include regulation means for maintaining the load voltage at a given level. Such a means may include inductances for transferring energy from the solar array to the battery system and the loads, or for transferring energy from the battery system to the loads, the transfers being accomplished with battery system voltage levels either above or below the desired system voltage level. Such inductances, in practice, are bulky and heavy. Since spacecraft are limited in their mission by weight factors, any reduction in the weight for equipment such as the energy transfer devices can result in additional weight for accomplishing the satellite mission.

In a system embodying the present invention, the number of inductances employed in energy transfer systems is reduced. In applications such as discussed above, this reduction in the number of parts and the corresponding reduction in bulk, complexity and weight, contribute to the reduced cost and increased reliability of a spacecraft such as the earth orbiting satellite.

IN THE DRAWING

Figure 2:
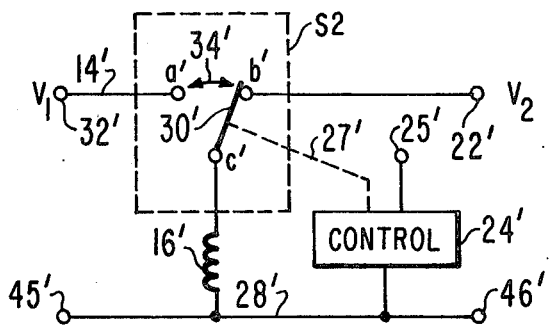
Figure 4:
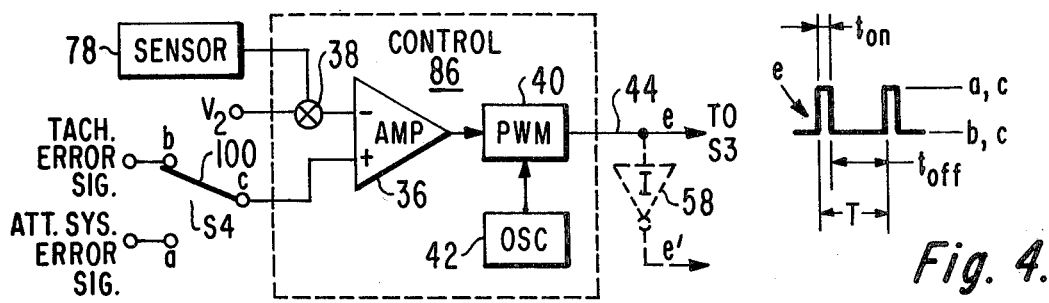
Figure 5:
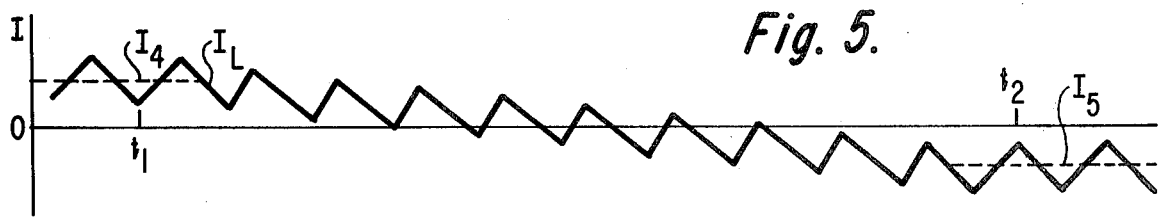
Figure 6:
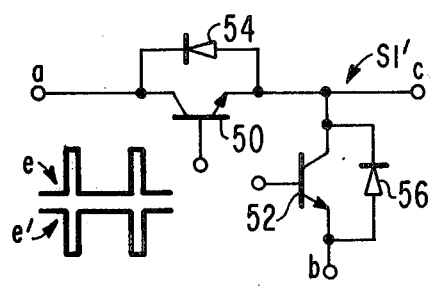
Figure 3:
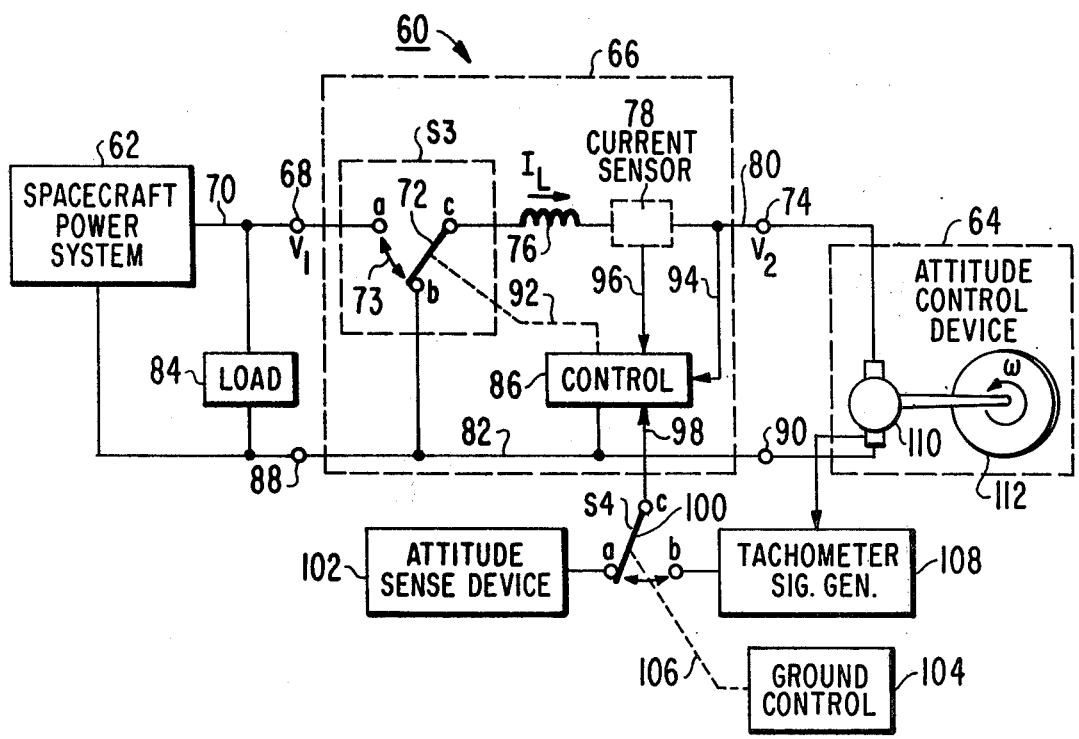

FIG. 1 is a schematic showing, mainly in block diagram form, of an embodiment of the present invention, wherein the voltages exhibited by the two energy devices are of like polarity and the magnitude of a first voltage is greater than the magnitude of a second voltage, FIG. 2 is a schematic showing of a second embodiment of the present invention wherein the voltages exhibited by the two energy devices are of opposite polarity, FIG. 3 is a block and schematic diagram of a spacecraft system which includes an embodiment of the invention, FIG. 4 is a block and schematic diagram of a duty cycle modulator for controlling the switch of FIG. 3, FIG. 5 is a diagram of the current waveform through the inductance of FIG. 3 useful in explaining the principles of the present invention, and FIG. 6 is a simplified schematic diagram of a solid state power switch which can be used in the systems of FIGS. 1 and 3.

In FIG. 1 bidirectional energy transfer apparatus 10 includes an energy device 12 connected via bus 14 to switch S1. The latter operates as a single-pole, double-throw switch which can connect device 12 to energy device 18 through inductance 16. Energy device 12 exhibits a first voltage $V_1$ at terminal 32, while the energy device 18 exhibits a second voltage $V_2$ at terminal 22. Load 20 is connected between bus 14 and common return 28, which may be at a reference potential, e.g., ground. Load 21 is connected between bus 15 and common return 28. A signal preferably representing a system parameter is applied to input terminal 25 of control 24. The signal may be a voltage and it may represent a parameter such as the attitude of a spacecraft, the charge in a battery, the speed of a motor, a current representing some operating condition, and so forth. As will be shown later, the value of this signal (polarity and magnitude) may be a function of either or both of voltages $V_1$ an $V_2$. The signal may, in the alternative, represent a parameter having a value which is independent of the system for controlling the energy transfer between devices 12 and 18.

Control 24 controls the duty cycle of switch S1, as illustrated by dashed line 27, at a repetition rate (which may be fixed or variable) which is a function of the value of the signal appearing at terminal 25. Control 24 is connected to a point of reference potential at common return 28. Switch S1 is schematically shown as a single-pole, double-throw switch to represent the function of the switch. In practice, switch S1 may comprise several switches as will be shown later. Switch S1 comprises an arm 30 connected at one end to terminal c inductance 16 and selectively movable between terminals a and b at its other end. Terminal b is connected to the common return 28. Terminal a is connected to terminal 32.

The energy devices 12 and 18, in practice, each may include any source of electrical energy, for example, a battery, a transmission line, a solar panel array as used in a spacecraft system or any other energy device or combination thereof, which exhibits either a fixed or a variable voltage. The loads 20 and 21 may be separate loads, as shown, or may be part of the internal structure energy devices 12 and 18.

The energy devices 12 and 18 may be caused to store or to provide energy, or both, dependent on the value of their respective voltages $V_1$ and $V_2$ and their respective voltage-current characteristics. The magnitude of voltage $V_1$ is always greater than that of voltage $V_2$ in the configuration of FIG. 1. The relationship between the magnitudes of the voltages $V_1$ and $V_2$ can be shown to be determined by the duty cycle of switch S1 as follows. During the interval $T_{ON}$, when switch S1 connects terminal a to terminal c, the change in current $\Delta I_{ON}$ in inductance value L is shown by the relationship $$\Delta I_{ON} = \frac{V_1 - V_2}{L} T_{ON} \qquad 1)$$

and during the interval $T_{OFF}$ when switch S1 connects terminal b to terminal c, the change in current $\Delta I_{OFF}$ in inductance 16 is shown by $$\Delta I_{OFF} = -\frac{V_2}{L} T_{OFF} \qquad 2)$$

For an equilibrium condition $$(3) \quad \Delta I_{ON} = -\Delta I_{OFF}$$

therefore, $$\frac{V_1 - V_2}{L} T_{ON} = \frac{V_2}{L} T_{OFF} \qquad 4)$$

or $$\frac{V_2}{V_1} = \frac{T_{ON}}{T_{ON} + T_{OFF}}, \text{ where} \quad 5)$$

$$\frac{T_{ON}}{T_{ON} + T_{OFF}} = \text{duty cycle} \quad 6)$$

Thus, the control 24 which controls the duty cycle of the switch S1 also controls the relationship of the voltages $V_1$ and $V_2$. The relationship of the voltages of the energy devices 12 and 18 and their internal voltage-current characteristics determine the energy transfer. By voltage-current characteristics is meant the voltage across the device as a function of a current through the device. For example, if energy device 12 has an unloaded voltage $V_{12}$ and an internal resistance $R_{12}$ and energy device 18 has an unloaded voltage $V_{18}$ and an internal resistance $R_{18}$; and the average inductance current is designated as $I_{AV}$ with the positive direction of current defined as from energy device 12 to energy device 18, the following relationships may be shown.

(7) $V_1 = V_{12} - I_{AV}R_{12}$ (8) $V_2 = V_{18} + I_{AV}R_{18}$ and since $$\frac{V_2}{V_1} = \text{duty cycle (equation 5)}$$

$$I_{AV} = \frac{\text{duty cycle} \times V_{12} - V_{18}}{R_{18} + \text{duty cycle} \times R_{12}} \quad 9)$$

For duty cycle $> V_{18}/V_{12}$, $I_{AV}$ will be positive in the assumed direction and energy will transfer from energy device 12 to energy device 18. For duty cycle $= V_{18}/V_{12}$, $I_{AV}$ will be zero and no energy transfer will take place. For duty cycle $< V_{18}/V_{12}$, $I_{AV}$ will be negative in the assumed direction and energy will transfer from energy device 18 to energy device 12.

In the embodiment of FIG. 2, voltages $V_1$ and $V_2$ are opposite in polarity. Arm 30' of switch S2 is connected at one end to common terminal c' and is switchable between terminals a' and b' at its other end. Voltage $V_1$ is applied to 32' from bus 14' to terminal a'. Inductance 16' is connected between terminal c' and common return 28'. Terminal b' is connected to terminal 22'. The operation of the circuit of FIG. 2 is similar to that of FIG. 1. In this case it can be shown where $\Delta I_{ON} = \Delta I_{OFF}$, $$\frac{-V_2}{V_1} = \frac{T_{ON}}{T_{OFF}} = \frac{\text{duty cycle}}{1 - \text{duty cycle}} \quad 10)$$

Where duty cycle is defined in equation 6.

If the energy devices 12 and 18 have characteristics, by way of example, similar to that asumed above in deriving equation 9, the following relationship may be derived from equation 10.

$$I_{AV} = \frac{V_{12} \frac{\text{duty cycle}}{1 - \text{duty cycle}} + V_{18}}{\frac{\text{duty cycle}}{1 - \text{duty cycle}} P_{12} + P_{18}} \quad 11)$$

(12) $I_{12} = \text{duty cycle} \times I_{AV}$

(13) $I_{18} = (1-\text{duty cycle}) \times I_{AV}$

Where $I_{12}$ is the average current of energy device 12 and $I_{18}$ is the average current of energy device 18.

As a result energy will transfer between device 12 and device 18 depending on the values of voltages $V_1$ and $V_2$, the voltage-current characteristics of the energy devices, and the duty cycle. This bidirectional energy transfer occurs with the use of a single inductance 16 or the equivalent thereof (such as two serially connected inductances).

The circuit of FIG. 2 may be inserted in the circuit of FIG. 1 at the terminals legended with the unprimed numbers corresponding to 32', 22', 45', and 46'. The energy transfer apparatus of FIGS. 1 and 2 operate in both the voltage buck and voltage boost regulating modes. In the boost mode, energy is transferred from energy device 18 to energy device 12, while in the buck mode, energy is transferred from energy device 12 to energy device 18. The regulation provided switch S1 by control 24 is such that control 24 tends to maintain and regulate the voltage $V_1$ and $V_2$ or any other parameter of the system which has a value which may be a function of one of the voltages $V_1$ or $V_2$ in accordance with the goals of the circuit. The input signal at terminal 25 may be derived, sensed, or otherwise originate from any portion of a system. This signal maybe a function of at least one of the voltages $V_1$ and $V_2$; alternatively the signal maybe independent of voltages $V_1$ and $V_2$ to serve as an open loop control of voltages $V_1$ and/or $V_2$.

In the system of FIG. 3, satellite attitude control system 60 includes a spacecraft power system 62 coupled to attitude control device 64 through bilateral energy transfer apparatus 66. Power system 62 is connected to terminal 68 via power bus 70. Terminal 68 exhibits a power voltage $V_1$ which is applied to terminal a of switch S3 within apparatus 66. Arm 72 of the switch S3 has a common terminal c connected to terminal 74 through inductance 76, current sensor 78 and bus 80. Terminal 74 exhibits voltage $V_2$ which is always, in this embodiment, less than voltage $V_1$. Terminal 74 is connected to attitude control device 64. Connected between bus 70 and common return 82 is the spacecraft load 84 which may be the various spacecraft payload devices. Common return 82 which may be at a reference potential such as ground is connected to power system 62, attitude control device 64, terminal b of switch S3 and control 86. Common return 82 includes terminals 88 and 90.

Control 86 determines the switch position of wiper 72 via dashed line 92. Arm 72 connects either terminal a to terminal c or terminal b to terminal c. As will be shown in connection with FIG. 6, switch S3, while shown as a single pole, double throw switch may, in practice, be two separate switches operated in phase opposition. Control 86 receives as one input the voltage $V_2$ at lead 94. A second input is a signal representing the current flowing in bus 80 sensed by sensor 78 and applied to control 86 as a voltage via lead 96. A third input to control 86 is applied to lead 98. Lead 98 is connected to arm 100 at common terminal c. Attitude sense device 102 is connected to switch S4, terminal a. Ground control 104 determines the switch position of arm 100 via dashed line 106. Terminal b of switch S4 is connected to tachometer error signal generator 108.

Attitude control device 64 includes a motor 110, connected between terminals 74 and 90. The speed of motor 110 is determined by the voltage appearing at terminal 74. Motor 110 drives flywheel 112 at an angular velocity w.

The angular velocity w of flywheel 112 determines the attitude of the spacecraft within which system 60 is secured. This control of spacecraft attitude is achieved in a well known manner and need not be described in detail herein. Tachometer error signal generator 108 senses the speed of the motor 110 and thus, flywheel 112 and sends a suitable error signal representing the actual speed as compared to a desired speed to terminal b, switch S4. The attitude sense device 102 is a device which senses the orientation of the spacecraft and sends an error signal representing that orientation to terminal a, switch S4. Ground control 104 generates a suitable switch control signal to place switch S4 either in the speed control mode connecting tachometer error signal generator 108 to control 86 or in a spacecraft attitude control mode connecting attitude sense device 102 to control 86. When device 102 is connected to control 86, the spacecraft is in the closed loop automatic attitude control mode. When generator 108 is connected to control 86, the flywheel 112 is rotated and controlled at a predetermined rate in accordance with particular system requirements whose significance is not important to the understanding of the present invention.

The current sensor 78 provides a signal to control 86 which will override all other inputs to control 86 to protect motor 110 in case the motor 110 current exceeds a given limit. This is merely a safety device.

The spacecraft power system may include a solar array (not shown) connected across a battery system (not shown). The power system in this case would also include suitable battery charge and discharge circuits (not shown). In the embodiment illustrated, the voltage $V_1$ at terminal 68 is essentially fixed but the voltage $V_2$ at terminal 74 is variable in accordance with the duty cycle of switch S3 as determined by control 86.

Control 86 is shown in more detail in FIG. 4. It includes a differential amplifier 36 having the inverting input connected to summing junction 38. Sensor 78 and terminal 74, (FIG. 3), are connected to junction 38.

The tachometer error signal from tachometer error signal generator 108 or the attitude system error signal from attitude sense device 102 are selectively connected to the non-inverting input of amplifier 36 in accordance with the switch position of switch S4. The voltage at junction 38 is compared to the voltage at terminal c switch S4 by amplifier 36. This action produces an error signal at the amplifier 36 output which is applied as an input to pulse width modulator (PWM) 40. A sawtooth wave is applied to PWM 40 by oscillator 42 at a suitable frequency which may be fixed or variable.

The output of the pulse width modulator (PWM) 40 is applied to switch S3, arm 72, via lead 92 and appears as curve e having a time period T at a suitable frequency. Modulator 40 produces a square wave curve e whose duty cycle is modulated in accordance with an error signal produced by amplifier 36 in correspondence to the value of the voltage applied to amplifier 36 through switch S4.

In FIG. 3, energy is derived from the system 62 at a first voltage $V_1$ and flows through the energy transfer apparatus 66 into device 64 at second voltage $V_2$. The energy transferred is a function of the duty cycle of switch S3 in response to error signals applied to control 86.

Arm 72 is driven in direction 73 at that duty cycle. The duty cycle and the current averaging effects of inductance 76 determine the value of the second voltage $V_2$. Voltage $V_2$ applied to the motor 110 rotates the motor storing kinetic energy in the flywheel 112. The steady state angular speed w of the motor is related to the motor terminal voltage such that an increasing voltage causes the motor shaft to accelerate and a decreasing voltage causes the motor shaft to decelerate.

The control mode of motor voltage $V_2$ is selected by switch S4. In a first mode, assume that arm 100 of switch S4 connects the tachometer signal from generator 108 to amplifier 36. The tachometer signal is monotonic with respect to the rotational speed w of the flywheel 112. Further assume a steady-state operating condition. Subsequent description will be made of the means by which energy is transferred into the flywheel 112 and to the system 62 and load 84. Generator 108 error signal and voltage $V_2$ applied to amplifier 36 create an error signal applied to PWM 40 whose output is a pulse train curve e at a given repetition rate of 1/T as shown in FIG. 4 (assume the signal from sensor 78 is zero at this time). The duty cycle of curve e is defined as the ratio of $t_{on}$ to T. The signal represented by curve e is applied to switch S3 which alternatingly connects inductance 76 to system 62 and to common return 82 resulting in a given value of voltage $V_2$ as defined in equation 5 above.

While in the first mode, assume that the flywheel 112 tends to decelerate due to increased losses in the motor 110 or some other cause. The tachometer error signal from generator 108 correspondingly decreases in magnitude causing an increase in the magnitude of the value of the error signal from amplifier 36 and a corresponding increase in the $t_{on}$ time of curve e relative to its time period T. This action causes the switch S3 to be connected to system 62 for a proportionately greater portion of period T thereby increasing the magnitude of voltage $V_2$ applied to the motor 110. This increasing voltage tends to cause the motor to accelerate, increasing the flywheel speed W until the tachometer error signal and voltage $V_2$ achieve balance.

While in the first mode, assume that the input voltage $V_1$ increases, which, in the absence of any duty cycle correction, would cause voltage $V_2$ to proportionately rise in a manner as defined by equation 5. If uncorrected, this action would accelerate the flywheel. As voltage $V_2$ tends to increase with the instantaneous tachometer error signal remaining constant, an imbalance is created at the inputs to amplifier 36. This action is the error signal magnitude to PWM 40 which correspondingly reduces the time $t_{on}$ relative to periord T curve e. Switch S3 therefore is connected for a shorter proportion of time T to system 62. The voltage ratio of $V_2/V_1$ decreases according to equation 5 causing voltage $V_2$ to remain essentially uncharged from its original value and a balance to again be restored at the inputs to amplifier 36. Other imbalance effects and their connections will be apparent in the presence of various disturbance in addition to those described above and need not be further described herein.

In a second mode, assume that system 60 is operated with arm 100 of switch S4 in the position connecting attitude system generated error signal from device 102 to control 86. Satellite attitude control is performed by changing the speed w of the motor shaft and therefore the value of the energy stored as angular momentum in the flywheel. The satellite system transfers momentum to and from the flywheel causing changes in the spacecraft attitude. Assume that the attitude error signal is at some given value and the voltage $V_2$ through the action of control 86 and switch S3 is at balance at the input amplifier 36. FIG. 5 shows a typical current waveform for such an operating condition for the time preceeding $t_1$ when average current $I_4$ is flowing in inductance 76 and hence in motor 110 in a direction polarity as shown in FIG. 3. Current $I_4$ could produce, for example, a torque to overcome the effects of frictional or other losses and maintain a constant angular speed w of the flywheel. Average current $I_4$ is the effective value of current $I_L$ which has an alternating current component produced by the switching action of switch S3 and the inductive action of inductance 76.

At time $t_1$ the attitude system requires that the stored energy of the flywheel be reduced and therefore generates an attitude system error signal input of reduced magnitude to control 86. This creates an imbalance at the input terminals of amplifier 36 decreasing the duty cycle of curve e as described above, causing the magnitude of voltage $V_2$ to decrease such that balance is again restored at the inputs to amplifier 36. Voltage $V_2$ at this time being less than the internal motor voltage (generated proportionately to the speed of the motor and generally known as the counter electromotive force (emf) or back emf of the motor) and causes current to flow from the motor, decelerating the wheel and decreasing its stored energy. Energy removed during this condition flows as current $I_L$ through inductance 76 in a direction opposite that shown in FIG. 3 into system 62 and load 84. FIG. 5 shows the waveform during the transition time after time $t_1$ as the average current decreases through zero and reverses direction to become the average value $I_5$ at time $t_2$.

Sensor 78 provides an additional feature. The feedback signal from sensor 78 is summed at summing junction 38 and permits the duty cycle to be influenced by the current in bus 80 in addition to the other variable noted above, e.g., voltage $V_2$. Feedback from sensor 78 affects the output of amplifier 36 only when the current sensed by sensor 78 exceeds a predetermined arbitrary maximum value. The value selected is that magnitude which will protect the motor from physical damage due to heating and other deleterious effects regardless of the value of the other variables. Other sense devices (not shown) may be connected to summing junction 38 to achieve protection or control as desired in addition to those described.

Also significant is the means for determining the duty cycle frequency. Oscillator 42 controls the frequency of operation of switch S3 for simplicity of illustration. Oscillator 42 sets period T and provides a ramp signal to PWM 40 for pulse width modulating the error signal from amplifier 36.

In an alternate form of system, PWM 40 in combination with amplifier 36 can be constructed to form a high gain system which provides a low output, $t_{off}$ curve e, when the input to the inverting (−) input of amplifier 36 is greater in magnitude than the input to the non-inverting (+) input of amplifier 36. Amplifier 36 and PWM 40 provide a high output signal, $t_{on}$ curve e, when the relative magnitudes of the inputs to amplifier 36 are reversed with respect to the magnitudes described immediately preceding. Thus, the variable being controlled, voltage $V_2$, can, without an oscillator and the accompanying delay, affect the state of the switch S3 via control 86. The frequency at which switch S3 switches is determined by the values of voltages $V_1$, $V_2$, the various input signals, the values of inductance 76, and the characteristics of system 62, device 64, and control 86.

When one of the energy storage devices is a battery, additional means (not shown) for monitoring and protecting the battery from overcurrent and overvoltage conditions during charge may be provided including means for monitoring the battery charge current, the battery terminal voltage, battery temperature and battery signal electrode voltage. The signal or signals thereby obtained may be employed as an input signal (or signals) to a control (such as 86) for obtaining duty cycle modulation at the desired value.

In connection with FIGS. 1 and 3, switches S1 and S3 are shown functionally as double throw switches having a single wiper arm positionable to two switch positions. In practice, such a switch can be implemented by the configuration of FIG. 6 utilizing two transistor switches operated in opposition. In FIG. 6 switch S1' includes first and second NPN transistors 50 and 52, respectively. Transistor 50 has its collector connected to terminal a and its emitter to terminal c while transistor 52 has its collector connected to terminal c and its emitter connected to terminal b. A diode 54 is connected across transistor 50 between terminals a and c and oriented to allow current flow in a direction opposite of the collector-emitter path of transistor 50. A diode 56 is connected between terminals b and c across transistor 52 and oriented to allow current flow in a direction opposite that of the collector-emitter path of transistor 52. Transistors 50 and 52 are operated in phase opposition so that only one transistor is on while the other is off at any given time.

The output lead 44 of control 86 FIG. 4 is connected to an inverter 58 (dashed). Lead 44 in this case is connected to the base electrode of transistor 50 while the output of inverter 58 is connected to the base electrode of transistor 52. The signal represented by curve e FIG. 4 is applied to transistor 50 while the curve e' signal is applied to transistor 52. It is readily apparent that the transitors 50 and 52 operate as a double throw switch with its arm connected to terminal c. In essence, the switches S1 and S3 of FIGS. 1 and 3 could be any solid state switch of which FIG. 6 is but one example. Similarly solid state switching can be used in the embodiment of FIG. 2.

It will now be apparent that an apparatus has been described that can be used in a wide variety of implementations where energy from a plurality of sources may vary. The energy transfer apparatus provides a regulated supply of energy that is uninterruptable even though one of the sources may interrupt. This can be achieved by a simple arrangement using a single inductance.

What is claimed is:

1. An energy transfer apparatus for use in a system including a first energy device exhibiting a first voltage with respect to a point of reference potential and a second energy device exhibiting a second voltage with respect to said point of reference potential, said system exhibiting a parameter whose value is a function of the value of at least one of said voltages, said apparatus comprising:

an inductance, and means operating effectively as a single pole, double throw switch cyclically connecting its arm between first and second switch positions thereof at a settable duty cycle recurring at a given repetition rate, said means, in operation, connecting said inductance across one of said devices in one switch position and connecting said inductance between said devices in the other switch position for controlling the current flow through said inductance as a function of (i) the respective values of said first and second voltages, (ii) the duty cycle of said means, and (iii) the voltage-current characteristics of the energy devices, said function being such that for any given respective values of (i) said first and second voltages, (ii) the duty cycle of said means, and (iii) the voltage current characteristics of the energy devices, said current assumes a certain equilibrium average value in any one of two directions determined by said duty cycle having a particular predetermined value that bears a one to one correspondence with said respective values of said first and second voltages, said current, and said voltage-current characteristics of the energy devices, said means further including control means responsive to a control signal indicative of said parameter for varying the setting of said duty cycle in accordance with the value of said parameter then present to achieve the predetermined value corresponding thereto.

2. The apparatus of claim 1 wherein said means in circuit with said inductance comprises means for applying said first voltage to said first switch position, means for applying said point of reference potential to said second switch position, and means for applying said second voltage to said switch arm through said inductance, and wherein said function being defined by the relationship $$I_{AV} = \frac{(D \times V_1) - V_2}{D \times R_1 + R_2}$$

where $V_1$ and $V_2$ represent the values of said first and second voltages respectively, $t_1$ and $t_2$ represent the time intervals the means operating effectively as a double throw switch is respectively in the first and second switch positions during each cycle thereof, D is the settable duty cycle $(t_1/t_1 + t_2)$, and $R_1$ and $R_2$ respectively represent the equivalent internal resistance of said first and second energy devices.

3. The apparatus of claim 2 wherein said control means includes means which varies the setting of said duty cycle in accordance with the value of said second voltage $V_2$.

4. The apparatus of claim 2 wherein said means operating effectively as a double throw switch includes first, second and third terminals, and a first switch connected between said first and second terminals and a second switch connected between said second and third terminals, said second terminal corresponding to said arm and said first and third terminals respectively corresponding to said first and second switch positions, said first and second switches being operated in opposition by said control means so that only one of said switches is closed and the other is open in the same time interval.

5. The apparatus of claim 1 wherein said control means includes means which varies the setting of said duty cycle in accordance with the value of one of said voltages, said arm including means responsive to a control signal applied as an input thereto for setting the arm switch position, said control means including pulse width modulating means for generating said control signal having a duty cycle corresponding to the value of said one voltage and including means for applying said control signal to said means responsive to said control signal for setting the arm switch position.

6. The apparatus of claim 1 wherein said means in circuit with said inductance comprises means for applying said point of reference potential to said arm through said inductance, means for applying said first voltage to said first switch position, and means for applying said second voltage to said second switch position, and wherein said function being defined by the relationship $$I_{AV} = \frac{V_1 \times \frac{D}{1-D} + V_2}{\frac{D}{1-D} \times R_1 + R_2}$$

where $V_1$ and $V_2$ represent the values of said first and second voltages, respectively, $t_1$ and $t_2$ represent the time intervals the means in circuit with said inductance is respectively in the first and second switch positions during each cycle thereof, D is the settable duty cycle $(t_1/t_1 + t_2)$, and $R_1$ and $R_2$ respectively represent the equivalent internal resistances of said first and second energy devices.

7. The apparatus of claim 5 wherein said control means includes means which varies the setting of said duty cycle in accordance with the value of said second voltage $V_2$.

8. The apparatus of claim 6 wherein said means operating effectively as a double throw switch includes first, second and third terminals, and a first switch connected between said first and second terminals and a second switch connected between said second and third terminals, said second terminal corresponding to said arm and said first and third terminals respectively corresponding to said first and second switch positions, said first and second switches being operated in opposition by said control means so that only one of said switches is closed and the other is open in the same time interval.

9. A circuit for transferring energy between first and second terminals comprising, in combination:
 a first current path which can be opened or closed connected between said first terminal and a point of reference potential;
 a second current path which opens when said first path is closed and vice versa, said second current path being connected between said second terminal and one of (a) said first terminal and (b) said point of reference potential;
 an inductor in a current path common to said first and second paths; and
 means responsive to a control signal for opening and closing said first current path and for controlling the ratio between the time interval said first current path is closed and the complete period during which the first current path is both closed and open.

10. The circuit of claim 9 wherein said second current path is connected between said first and second terminals, said inductor being in series between said first and second terminals.

11. The circuit of claim 10 wherein said means responsive to a control signal includes means responsive to a signal whose value is a function of the voltage present on at least one of said first and second terminals.

12. The circuit of claim 9 wherein said second current path is connected between said second terminal and said point of reference potential, said inductor being connected between each said terminals and said point of reference potential.

13. The circuit of claim 12 wherein said means responsive to a control signal includes means responsive to a signal whose value is a function of the voltage present at at least one of said first and second terminals.

14. The circuit of claim 9 further including switch means is said first and second current paths for opening and closing said paths, said means responsive to a control signal including switch control means for cyclically operating said switch means to control said ratio.

* * * * *